May 10, 1966 W. FREDE 3,250,286

PRESSURE TRANSMITTER

Filed May 13, 1964 2 Sheets-Sheet 1

INVENTOR:
Wilhelm Frede
BY
Darbo, Robertson & Vandenburgh.
Attys.

May 10, 1966 W. FREDE 3,250,286

PRESSURE TRANSMITTER

Filed May 13, 1964 2 Sheets-Sheet 2

INVENTOR:
Wilhelm Frede
BY
Darbo, Robertson & Vandenburgh,
Attys.

United States Patent Office 3,250,286
Patented May 10, 1966

3,250,286
PRESSURE TRANSMITTER
Wilhelm Frede, 15 Schillerstrasse, Dusseldorf, Germany
Filed May 13, 1964, Ser. No. 367,141
Claims priority, application Germany, May 17, 1963, F 39,762
14 Claims. (Cl. 137—85)

The present invention relates to a pressure transmitter or controller wherein a fluid pressure is controlled as a function of another fluid pressure.

Pressure transmitters are known wherein a measuring pressure diaphragm and a controlled pressure diaphragm are in engagement with a common lever and wherein an outlet restrictor of the controlled pressure acting on the controlled pressure diaphragm behind a pre-restrictor is controllable in dependence on the adjusting force acting on the lever. With such pressure transmitters the ratio of measuring pressure to controlled pressure may easily be varied by adjusting the lever arm ratio. However, such pressure transmitters are relatively complicated structurally, space-consuming and generally show hysteresis phenomena due to bearing friction. The measuring pressure diaphragm and the controlled pressure diaphragm may be arranged to be coaxial by connecting them through an axially movable control shaft. Such an arrangement provides a simple space saving assembly without lever pivoting and the hysteresis phenomena associated therewith. However, with such a coaxial arrangement the ease of changing a desired characteristic of the pressure transmitter normally obtained by changing the lever arm ratio of the other form is lost.

It is an object of the present invention to provide a simple and easy way of adjusting the ratio of measuring pressure to controlled pressure in a pressure transmitter of the type wherein a measuring pressure diaphragm and a controlled pressure diaphragm are arranged coaxially and are connected to each other by a control shaft. This permits the use of the more desirable type of pressure controller while not losing the ability to readily adapt the characteristic of the controller to the required conditions.

According to the present invention this object is being solved by providing that the controlled pressure diaphragm is fashioned as differential diaphragm system comprising several parallelly arranged diaphragms of differing size defining diaphragm chambers which differ in size from each other. A selector valve is provided whereby the controlled pressure is selectively passed into one or another of the different diaphragm chambers formed between the diaphragms. Thus, the force which is applied to the control shaft by the controlled pressure is made variable in that the controlled pressure may selectively be effective on diaphragm surfaces of different size. The differential diaphragm system might also be used on the measuring pressure side either alone or concurrently with its use on the controlled pressure side as hereinafter described.

The invention may be realized in simple manner in that the diaphragms of the differential diaphragm system are stacked to form a diaphragm stack in a housing between outer spacing rings having radial pressure feed passages, and inner spacing washers. The stack of the outer spacing rings has an axial inlet port provided therein into which the pressure feed passages open and wherein an axially movable plug is sliding as selector valve. By movement of the plug the inlet port of the controlled pressure may be communicated with a desired one of the diaphragm chambers. The effective difference of the diaphragm surface area is changed depending upon which of the diaphragm chambers is rendered effective. The adjusting range may be increased, if required, by employing two or more diaphragm stacks in series, each provided with separately movable valve plugs.

A particular advantage is attained in that the diaphragm stack is removably mounted on a reduced pin of the control shaft connected with the measuring pressure diaphragm. This makes it possible to selectively mount the diaphragm stack on the control shaft so that the force applied on the control shaft by the differential diaphragm system is directed either in one direction or the other axially of the control shaft. Significance of such reversal of direction of force will become more apparent hereinafter.

In the hereinafter described embodiments of the invention a valve seat body is mounted at the end of the control shaft. This valve body has a valve chamber and a valve passage which is communicated with an outlet channel of the diaphragm chamber of the differential diaphragm system next to the controlling pressure inlet. A valve closure is mounted in the valve chamber and is connected to regulate the controlled pressure in response to the position of the control shaft. In a modification of the invention the valve seat body has two oppositely arranged valve seats which selectively cooperate with the valve closing body in the sense of an outlet restrictor or bleeder valve. By designing the outlet restrictor valve in such a manner it is possible to achieve an increasing throttling effect with selective leftward or rightward movement of the control shaft depending upon the characteristics desired.

For further controlling the pressure transimtter characteristics, a helical compression spring is provided which selectively may supplement the force of the measuring pressure or act in opposition to the measuring pressure. To achieve this the spring may be mounted on the control shaft at one end with the other end thereof selectively supported against the housing of the measuring pressure diaphragm or against the housing of the differential diaphragm system. The force applied by the spring on the control shaft may thus be selectively directed either to the left or to the right on the control shaft so as to either assist the measuring pressure or be in counteraction thereto. Also, the characteristic of the spring may be made adjustable. To achieve this the helical compression spring is in threaded engagement with an externally threaded nut which also has internal threads engaging threads on the control shaft. The pitch of the external threads of the nut correspond to the pitch of the spring when it is not loaded.

The invention, and the objects and advantages thereof, is presented with reference to FIGS. 1–6 of the accompanying drawings and described as follows.

Figure 1:
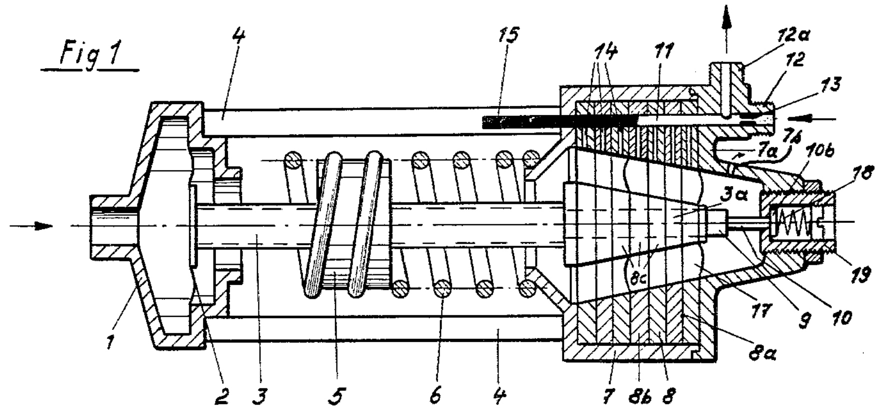
FIG. 1 is a schematic illustration showing the assembly of the pressure transmitter in longitudinal section.

The embodiment of FIGURE 1 has a body formed by a measuring diaphragm housing 1 and a controlled pressure diaphragm housing 7 rigidly connected by bars 4. Within measuring housing 1 is a measuring pressure diaphragm 2. A controlled pressure diaphragm stack 8 is removably mounted in housing 7. The diaphragm stack 8 comprises a plurality of differently sized disphragms 8*a* which are stacked between outer spacing rings 8*b* and inner spacing washers 8*c*. The diaphragm stack 8 is removably mounted on a reduced pin end 3*a* of an externally threaded control shaft 3. Control shaft 3 is secured to the measuring pressure diaphragm 2. A removable cap 7*a* of housing 7 holds spacing rings 8*b* and the diaphragms in housing 7.

Figure 3:
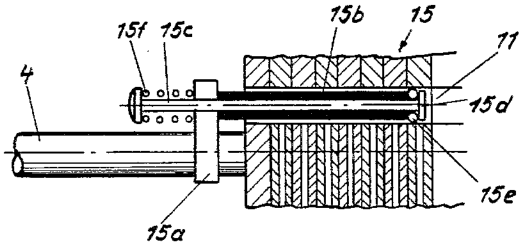
FIG. 3 is an enlarged view of the convenient design of the selector valve.

The diaphragm stack 8 has an axially aligned bore 11 therein forming a controlled pressure passage which is in alignment with an inlet socket 12 on the cover 7a of housing 7. The inlet socket 12 has a restricting orifice 13 arranged therein. Behind orifice 13 a connecting socket 12a for an operating pressure line communicates with passage 11. The outer spacing rings 8b of the diaphragm stack are formed with a plurality of pressure feed passages 14 each communicating with bore 11. Each of passages 14 also connect to a diaphragm chamber respectively. Bore 11 has an axially movable plug 15 arranged therein. FIG. 3 is an enlarged view of plug 15.

The connecting stationary bar 4 has a slider 15a slidably mounted thereon. A spacing sleeve 15b is connected to slider 15a and is loosely inserted in bore 11. A locking pin 15c extends through slider 15a and the spacing sleeve 15b. Pin 15c has an inner plate-like head 15d. Interposed between the inner end of the spacing sleeve 15b and the head 15d is an O-ring 15e sealing bore 11. A spring 15f is in compression between slider 15a and the knob end of pin 15c. This spring 15f compresses O-ring 15e between head 15d of the locking pin 15c and the adjacent end of sleeve 15b so that the O-ring is deformed and sealingly engages the walls of bore 11. If the locking pin 15c is pushed in, then the O-ring 15e is relieved so as to permit free axial movement of the whole plug 15 in bore 11.

Figure 5:
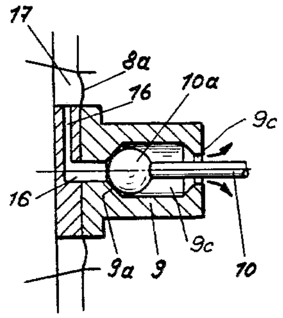
FIGS. 5 and 6 are enlarged sectional views of the outlet restrictor valve with various adjustments.

The end of the control shaft 3 has a control valve with a valve seat body 9 secured thereto which moves axially with the control shaft 3. An enlarged view of valve body 9 is illustrated in FIG. 5. A valve passage 16 communicates the end diaphragm chamber 17, i.e. the chamber nearest to the inlet socket 12. Passage 16 also communicates with a valve chamber 9c which in turn opens to atmosphere through openings 9b and 5b in body 9 and cap 7a respectively. Where passage 16 enters chamber 9c, the valve body forms a valve seat 9a which in conjunction with a valve closure 10a in the shape of a ball forms an outlet restrictor or bleeder valve. The ball 10a has a stem or pin 10 with a shoulder 10b. A spring 18 is in compression between shoulder 10b and an abutment in an adjusting sleeve 19 screwed into the housing cover 7a.

The external threads of the control shaft 3 have a nut 5 screwed thereon. Nut 5 has external threads which are engaged by a helical compression spring 6. The external thread of the nut 5 has a pitch corresponding to the pitch of the helical spring 6 when it is not loaded. At the other end the helical compression spring 6 bears against housing 7.

The operation of the described arrangement is as follows: Fluid under pressure enters the inlet port 11 through the restricting orifice 13. Depending upon the adjustment of plug 15 the fluid, e.g. air, enters the uncovered pressure feed passages 14 into the respective diaphragm chambers of the diaphragm stack 8. Because of the difference in areas of two of the diaphragms on which fluid pressure is exerted (on only one side), a leftward force is applied on the control shaft 3. The force is dependent on the difference of the greatest and of the smallest diaphragm face area impinged upon by the controlling pressure on one face thereof only. Which diaphragms are thus effective is determined by how far plug 15 releases the inlet port 11. The force is the least if plug 15 has been moved to the right to an extent sufficient to permit the controlled fluid to only enter into the end diaphragm chamber 15. The force is the greatest if plug 15 has been pulled all of the way to the left so as to allow the controlled fluid to become effective in the diaphragm chamber at the left end as well as at the right. In the intermediate chambers the force on the diaphragms are balanced by equal pressures on both sides.

The force of the controlled fluid on the control shaft 3 is counteracted by the measuring pressure on the measuring pressure diaphragm 2, with the force of the controlled fluid being assisted by the force of the helical compression spring 6.

Under the influence of these forces the outlet valve 9a/10a is more or less opened by the control shaft 3 and the pressure of the controlled fluid is thereby adjusted so as to achieve an equilibrium of forces on the control shaft. The forces on the control shaft 3 are expressed by the formula $$K_m - K_F = K_{St}$$

wherein:

$K_m$ = the force of measuring pressure on measuring pressure diaphragm 2.
$K_F$ = the force of spring 6, and
$K_{St}$ = the force of the controlled pressure on diaphragm stack 8.

The characteristic of the helical spring 6 may be changed by screwing same on nut 5 to a greater or less extent and thereby reducing or increasing the effective number of turns of the spring.

As an alternative, helical spring 6 may be mounted in compression between housing 1 and nut 5. To achieve this nut 5 is screwed to the right on the threads of the control shaft 3 and helical spring 6 screwed to the left on nut 5. When this has been done, helical spring 6 acts in opposition to the force of the controlled pressure on control rod 3 so that there is an equilibrium of forces if, $$K_m + K_F = K_{St}$$

In both cases an increase in the pressure of the controlled fluid is obtained with increasing measuring pressure, i.e. a rising characteristic of the pressure transmitter. This can be seen with reference to FIGURE 5. An increase in measuring pressure moves control rod 3, and thus valve body 9, to the right thus relatively closing valve 9a/10a. This results in less fluid being bled off through valve 9a/10a so that the fluid pressure downstream from orifice 13 is increased. In turn this increases the effective force ($K_{St}$) on rod 3 by diaphragm stack 8.

In some cases, however, a falling characteristic of the pressure transmitter is desired. That is to say, the pressure of the controlled fluid shall decrease with increasing measuring pressure. This may be also achieved with the described pressure controller. The valve seat body 9 connected with the control shaft 3 is additionally formed with a second valve seat 9b opposite the valve seat 9a. By changing the position of adjusting sleeve 19, valve ball 10a may be adjusted so as to cooperate with the valve seat 9b rather than seat 9a. Thus, with a rightward movement of the control shaft 3, the outlet restriction is reduced thereby reducing the pressure of the controlled fluid.

Figure 2:
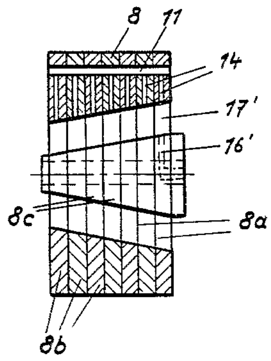
FIG. 2 is a fragmentary sectional view of an alternative removable diaphragm stack.
Figure 6:
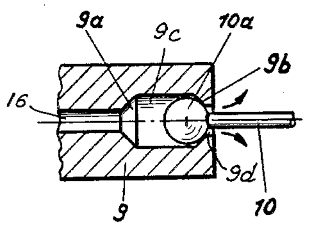

Another alternative is to reverse the diaphragm stack 8 when it is mounted in housing 7 and on pin 3a of the control shaft 3. This alternative is indicated in FIGURE 2. As is then illustrated, the largest diaphragm is positioned on the right-hand side with the associated diaphragm chamber 17' connected to the valve seat body 9 through an outlet channel 16'. With such an arrangement of the diaphragm stack 8, the force ($K_{St}$) exerted by the controlled fluid acts to the right, in the same direction as the force ($K_m$) exerted by the measuring pressure diaphragm. With the arrangement described with respect to FIGURE 6, both forces $K_{St}$ and $K_m$ would be acting an opening sense on the outlet valve 9b/10a. If both forces $K_m$ and $K_{St}$ are connected in opposition to the force $K_F$ of spring 6 supported against housing 7, which force $K_F$ would be effective in a closing sense on the outlet valve 9b/10a, then a decreasing controlled pressure is obtained with rising measuring pressure. Thus the pressure controller would have a falling characteristic.

Since the direction of force of the helical compression spring 6 and that of the diaphragm stack 8 are reversible, and since the outlet valve 9*a*/10*a* or the outlet valve 9*b*/10*a* may be used selectively, a universal applicability of the pressure controller is achieved. For example, with negative measuring pressures, a vacuum transmitter may be attained which may be adapted for rising as well as for falling characteristics.

Figure 4:
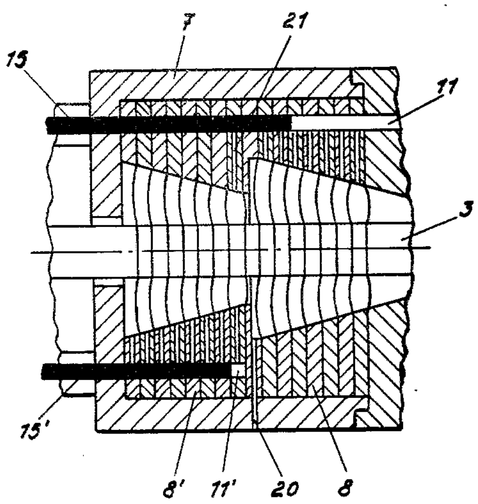
FIG. 4 is a sectional view of the arrangement of two diaphram stacks in series.

In the event that the force $K_{St}$ of the controlled fluid achieved by adjustment of plug 15 is not sufficient, a two series-arranged diaphragm stacks 8, 8' may be mounted in housing 7 and connected with the control shaft 3. Such an arrangement is shown in FIGURE 4. The last outer spacing ring 8*b* of the first diaphragm stack 8 has a diametrically opposite vent passage 20 arranged therein instead of a pressure feed passage 14. The second diaphragm stack 8' has an inlet passage 11' sealed by a movable plug 15' on the other side. If the first diaphragm stack 8 is fully impinged upon by pulling out of plug 15, the controlled pressure may be passed to the first diaphragm chamber of the second diaphragm stack 8' by uncovering a leading channel 21 and from there via the inlet port 11' may be passed also into the other diaphragm chambers of the second diaphragm stack 8' (depending upon the position of slide 15'). The forces arising in both diaphragm stacks 8, 8' add to enable the adjusting range to be thereby increased.

I claim:

1. In a fluid pressure controlling apparatus having an axially movable control rod actuating a control valve to adjust the pressure in a passageway, a measuring pressure diaphragm device connected to said rod and a controlled pressure diaphragm device connected to said rod, the improvement comprising: one of said devices including a plurality of diaphragms defining a plurality of diaphragm chambers, and valve means to connect said passage selectively to said chambers to selectively vary the force applied to said rod by said one device.

2. In an apparatus as set forth in claim 1, wherein said one device is the controlled pressure device and said valve is a bleeder valve.

3. In a fluid pressure controlling apparatus having an axially movable control rod actuating a control valve to adjust the pressure in a passageway, a measuring pressure diaphragm device connected to said rod and a controlled pressure diaphragm device connected to said control rod, the improvement comprising: one of said devices including a plurality of diaphragms of differing areas, said diaphragms being positioned in a series parallel to each other and defining a plurality of diaphragm chambers each with one diaphragm wall being larger in area than the other diaphragm wall, and valve means to connect said passage selectively to said chambers to selectively vary the force applied to said rod by said one device.

4. In an apparatus as set forth in claim 3, wherein said diaphragms increase in size from one end of said series to the other and each intermediate diaphragm of said series forms the common wall of two adjacent chambers, and wherein said valve means includes a valve body having an elongated opening, a sliding valve plug in said opening, and a plurality of passages, each communicating with said opening at spaced intervals therealong and also communicating with a chamber respectively and adapted to be sequentially opened by the movement of said plug in one direction and sequentially closed by the movement of said plug in the other direction.

5. In an apparatus as set forth in claim 4, wherein said one device comprises a housing and a diaphragm stack in said housing and including a plurality of outer spacer rings and a corresponding plurality of inner spacer rings with a diaphragm between each adjacent pair of rings, said inner rings being affixed to said rod, said outer rings being fixedly secured to the housing and having said passages extending radially therethrough.

6. In an apparatus as set forth in claim 5, wherein said opening is in said outer rings and extends parallel to said rod, said control valve is mounted on said rod and said passageway extends from the valve to the chamber at the end of said series nearest to said valve.

7. In an apparatus as set forth in claim 5, wherein said one device includes two of said diaphragm stacks each stack having its own sliding valve.

8. In an apparatus as set forth in claim 5, wherein said rod has an end portion of reduced cross sectional size extending axially within said housing, said inner rings being releasibly secured to said end portion.

9. In an apparatus as set forth in claim 4, wherein said plug comprises a hollow sleeve and locking pin extending through said sleeve with an enlarged head on the inner end of the pin, an O-ring between said head and the adjacent end of the sleeve and adapted to sealingly engage the inner wall of the opening when compressed between the head and end, and resilient means operatively coupled to the pin and sleeve to urge said head toward said adjacent end, and means whereby said head may be moved away from said adjacent end against said urging to release said O-ring.

10. In an apparatus as set forth in claim 6, wherein said control valve includes a body having a valve chamber on said rod and communicating with said passageway, said body defining an external opening from said chamber and a valve seat between said external opening and said passageway, a valve closure in said chamber and adapted to cooperate with said seat to prevent communication from said external opening and said passageway, and mounting means operatively connecting said closure and said housing to position said closure with respect to said seat in response to movement of the rod.

11. In an apparatus as set forth in claim 10, wherein said body defines two seats at opposite ends of the valve chamber, and wherein said mounting means provides an adjustment of the position of the closure axially of said rod.

12. In a fluid pressure controlling apparatus having an axially movable control rod actuating a control valve, to adjust the pressure in a passageway, a measuring pressure diaphragm device connected to said rod and a controlled pressure diaphragm device connected to said control rod, the improvement comprising: said devices each having a housing which housings are positioned at opposite ends of said rod and are spaced from each other, means connecting said housings to rigidly position each with respect to the other, biasing means connected to said rod intermediate said housings and including a spring adapted to alternatively bear against either housing to urge said rod in one direction or the other, one of said devices including a plurality of diaphragms defining a plurality of diaphragm chambers, and valve means to connect said passage selectively to said chambers to selectively vary the force applied to said rod by said one device.

13. In an apparatus as set forth in claim 12, wherein said rod is threaded intermediate said housings, said biasing means including a nut engaging the threads on the rod and a helical compression spring having turns of a given pitch when unloaded, said nut having external threads of said given pitch, said spring being engaged on the external threads on the nut.

14. In a fluid pressure controlling apparatus having an axially movable control rod actuating a control valve to adjust the pressure in a passageway, a measuring pressure diaphragm device connected to said rod and a controlled pressure diaphragm device connected to said control rod, the improvement comprising: said devices each having a housing which housings are positioned at opposite ends of said rod and are spaced from each other; means connecting said housings to rigidly position each with respect to the other; biasing means connected to said rod intermediate said housings and including a spring adapted to alternatively bear against either housing to urge said rod in one direction or the other; said rod being threaded intermediate said housings; said biasing means including a nut engaging the threads on the rod and a helical spring having turns of a given pitch when unloaded, said nut having external threads of said given pitch, said spring being engaged on the external threads on the nut; one of said devices comprising a housing and a diaphragm stack including a plurality of outer spacer rings and a corresponding plurality of inner spacer rings in said housing with a diaphragm between each adjacent pair of rings thereby defining a plurality of diaphragm chambers, said inner rings being affixed to said rod, said outer rings having passages extending radially therethrough; said control valve including a body on said rod and having a valve chamber communicating with said passageway, said body defining an external opening from said chamber and a valve seat between said opening and said passageway, a valve closure in said chamber and adapted to cooperate with said seat to prevent communication from said external opening and said passageway, and mounting means operatively connecting said closure and said housing to position said closure with respect to said seat in response to movement of the rod; and valve including a valve body having an elongated opening, and a sliding valve plug in said elongated opening, said passages communicating with said elongated opening at spaced intervals therealong to be sequentially opened by movement of said plug in one direction and sequentially closed by movement of said plug in the other direction.

No references cited.

M. CARY NELSON, *Primary Examiner.*

E. FEIN, *Assistant Examiner.*